SYSTEM FOR REPLACING ALL OR PART OF A FAULTY AMPLIFIER

Filed Sept. 5, 1967 2 Sheets-Sheet 1

INVENTORS: R. E. LAWSON
C.C. WILLHITE
BY H. L. Logan
ATTORNEY

July 7, 1970 R. E. LAWSON ET AL 3,519,945

SYSTEM FOR REPLACING ALL OR PART OF A FAULTY AMPLIFIER

Filed Sept. 5, 1967 2 Sheets-Sheet 2

United States Patent Office 3,519,945
Patented July 7, 1970

3,519,945

SYSTEM FOR REPLACING ALL OR PART OF A FAULTY AMPLIFIER

Richard E. Lawson, Burlington, and Charles C. Willhite, Greensboro, N.C., assignors to Bell Telephone Laboratories, Incorporated, Murray Hill, N.J., a corporation of New York Filed Sept. 5, 1967, Ser. No. 665,594
Int. Cl. G01r *19/16;* H03f *3/68*
U.S. Cl. 330—2 1 Claim

ABSTRACT OF THE DISCLOSURE

Summing point signals in feedback amplifiers are monitored by a threshold-type amplitude detector. When a fault occurs, a summing point signal exceeds a reference level and the detector produces an output that is effective to replace all or part of the amplifier responsible for the output.

GOVERNMENT CONTRACT

The invention herein claimed was made in the course of, or under contract with, the Department of the Army.

BACKGROUND OF THE INVENTION

Field of the invention

This invention relates to systems for automatically replacing faulty amplifiers or their components.

Description of the prior art

In many pieces of equipment, it is desirable, if not necessary, to maintain amplification even though an amplifier or one of its components fails. Because the results obtained when attempting such maintenance by continuous human supervision are not always satisfactory, several automatic arrangements have been developed.

One prior art automatic arrangement compares the output of an operative amplifier with the output of a standby amplifier having the same input so that should a failure occur in either amplifier, the standby amplifier is automatically connected in the circuit. Unfortunately, the nondiscriminatory nature of this arrangement may present a problem because it will substitute the standby amplifier when it is this amplifier that has failed.

Another prior art arrangement does not actually replace an amplifier but uses three parallel connected amplifiers. The outputs from these amplifiers are compared on a two-out-of-three basis with an amplifier output that agrees with at least one of the other amplifier outputs comprising the arrangement output. Although this is a highly reliable arrangement, it may be undesirable because of its redundant nature.

Another redundancy problem exists when using a plurality of either of the above mentioned arrangements in equipment that would otherwise use a number of single amplifiers. In particular, because each of the arrangements has amplifiers which are unique to that arrangement, the number of required amplifiers is two or three times the number of amplifiers otherwise required. A more economical use of amplifiers would be one where one or more standby amplifiers are shared by a plurality of amplifiers.

SUMMARY OF THE INVENTION

An object of the invention is to automatically replace a faulty amplifier or one of its components with a standby unit which unit need not be associated solely with that amplifier.

This and other objects are accomplished in accordance with the invention by first monitoring the signal at the summing point in the feedback path of an amplifier.

Under normal conditions, the summing point signal varies over a relatively small range. When a failure occurs that results in at least a partial loss in the feedback signal, the summing point signal varies over a wider range. When the range exceeds a reference level, the faulty amplifier or component is replaced by a standby unit.

In addition to accomplishing its intended object, the present invention offers a number of advantages. First, the standby unit need not be operating until it is used for replacement. Secondly, the invention may be successfully used with amplifiers that normally produce widely varying outputs because the summing point signal moves within a relatively small range when the amplifier is operating satisfactorily. Thirdly, the invention is applicable to amplifiers comprising one or more stages of amplification and using transistors, tubes, magnetics, fluid valves or the like. Fourthly, in general the failure of any active or passive element or of any energy supply in the amplifier is detected by the invention.

The last statement includes the expression "in general" because there are some failures that are not detected. In particular, open input impedances, shorted feedback impedances, and shorted summing points are not detected. This does not present a serious problem since the components involved are generally few in number and of relatively high reliability.

DESCRIPTION OF THE DISCLOSED EMBODIMENTS

Figure 1:
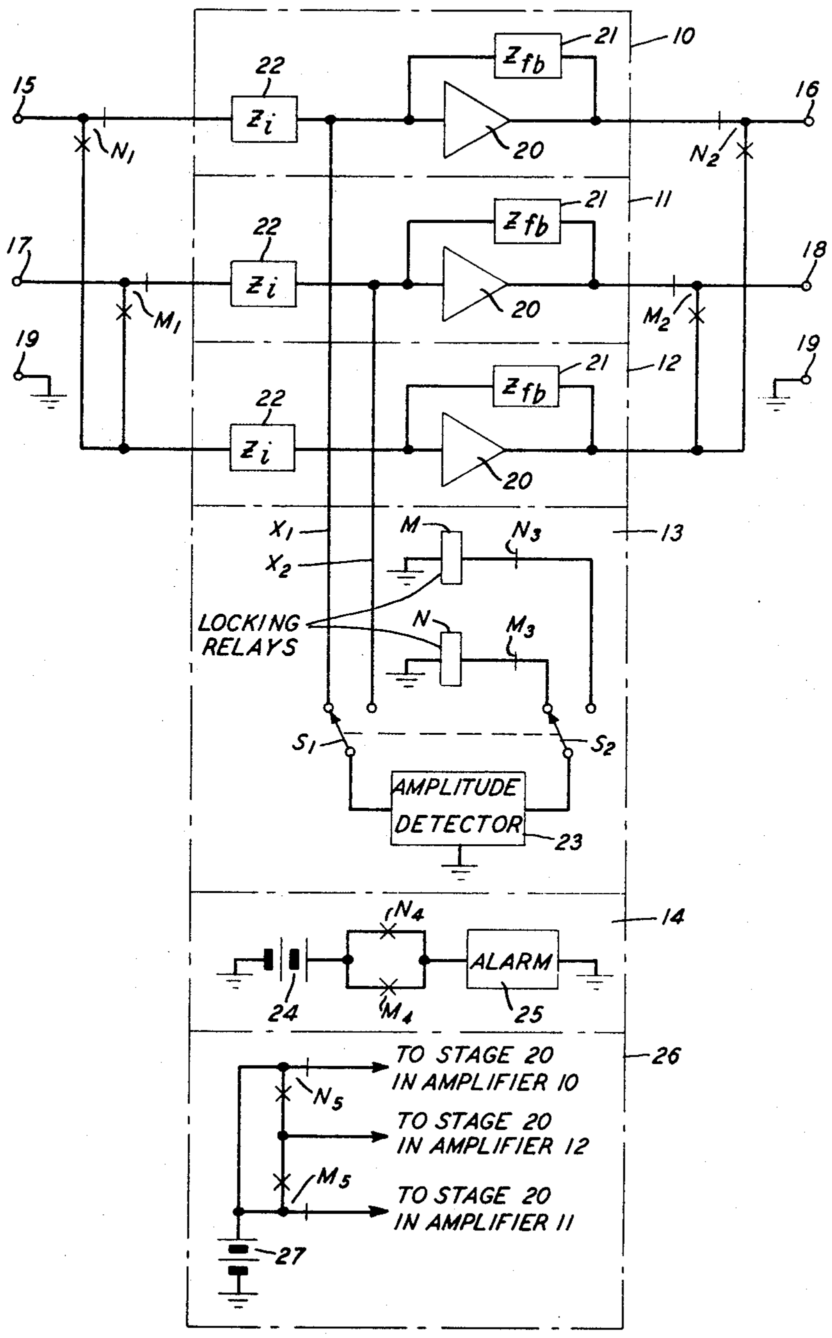
FIGS. 1 and 2 are block diagrams of respective embodiments of the invention.

The embodiment shown in FIG. 1 includes three substantially identical feedback amplifiers 10, 11 and 12, a control circuit 13 and an alarm circuit 14. Amplifier 10 is normally connected to an input terminal 15 by way of the normally closed portion of a set of relay transfer contacts $N_1$ and to an output terminal 16 by way of the normally closed portion of a set of relay transfer contacts $N_2$. Similarly, amplifier 11 is connected to input and output terminals 17 and 18 by way of the normally closed portions of relay transfer contacts $M_1$ and $M_2$. (All of the relay contacts shown in FIG. 1 form parts of relays M and N of control circuit 13; the contacts are shown in detached form.)

Amplifier 12 is the standby unit in this embodiment. The normally open portions of transfer contacts $N_1$, $M_1$, $N_2$ and $M_2$ are connected between amplifier 12 and input terminals 15 and 17 and output terminals 16 and 18, respectively. The remaining input and output terminals of the embodiment are grounded terminals 19.

Amplifier 10 comprises an amplifying stage (or stages) 20, a feedback path having a feedback impedance 21 and an input circuit having an impedance 22. As appreciated by those skilled in the art, the summing point of this feedback combination comprises the junction between elements 20, 21 and 22. A lead $X_1$ is connected between this summing point and control circuit 13.

Amplifiers 11 and 12 are substantially identical to amplifier 10 and consequently their individual components have been identified by the same symbols as used for amplifier 10. The summing point of amplifier 11 is connected to control circuit 13 by a lead $X_2$.

Control circuit 13 comprises a pair of synchronously operated single-pole double-throw switches $S_1$ and $S_2$. Switch $S_1$ alternately connects leads $X_1$ and $X_2$ to the input of an amplitude detector 23. Switch $S_2$ alternately connects the output of amplitude detector 23 to locking relays N and M by way of normally closed relay contacts $M_3$ and $N_3$, respectively. Switches $S_1$ and $S_2$ are operated back and forth by conventional means which have not been shown in the drawing for purposes of clarity.

Alarm circuit 14 comprises a battery 24 connected to an alarm 25 by way of a pair of parallel connected normally open relay contacts $N_4$ and $M_4$.

FIG. 1 also includes a power transfer circuit 26. This circuit comprises a battery 27 which is connected by the normally closed portions of relay transfer contacts $N_5$ and $M_5$ to amplifiers 10 and 11. The normally open portions of transfer contacts $N_5$ and $M_5$ are connected between the battery and amplifier 12. By this arrangement, amplifiers 10 and 11 are normally energized while amplifier 12 is not energized. When, however, either one of amplifiers 10 and 11 is de-energized, amplifier 12 is energized.

Under normal operating conditions, amplifiers 10 and 11 are energized and connected to terminals 15 through 18. Furthermore, the summing point signals which are being alternately sampled by detector 23 are within their normal operating ranges. The output from detector 23 does not, therefore, cause either of relays M and N to operate.

Now consider, as an example, the case where the gain of stage 20 of amplifier 10 decreases. Under such a condition, the signals fed back to the summing point decrease and the summing point signals increase. When the gain decreases beyond a given level, the normal input signals applied to terminal 15 result in a summing point signal level that is detected by detector 23. The resulting output from detector 23 operates relay N, which remains locked in an operated state. When relay N is operated, contacts $N_1$ and $N_2$ switch amplifier 12 in place of amplifier 10, contacts $N_3$ prevent relay M from being subsequently operated, contacts $N_4$ cause alarm 25 to be energized and contacts $N_5$ de-energize amplifier 10 while energizing amplifier 12.

A second example to consider is when feedback impedance 21 of amplifier 10 becomes open circuited. When this occurs, the feedback signal becomes zero and the summing point signal increases. When this happens the normal inputs to amplifier 10 result in a summing point signal level in excess of the threshold of detector 23, amplifier 10 is replaced by amplifier 12.

A third example is the failure of the power supply of amplifier stage 20. The summing signal then exceeds the threshold of detector 23 and amplifier 10 is replaced by amplifier 12.

The above discussed three examples are equally applicable to failures in amplifier 11 when amplifier 12 has not already been used to replace amplifier 10.

Figure 2:
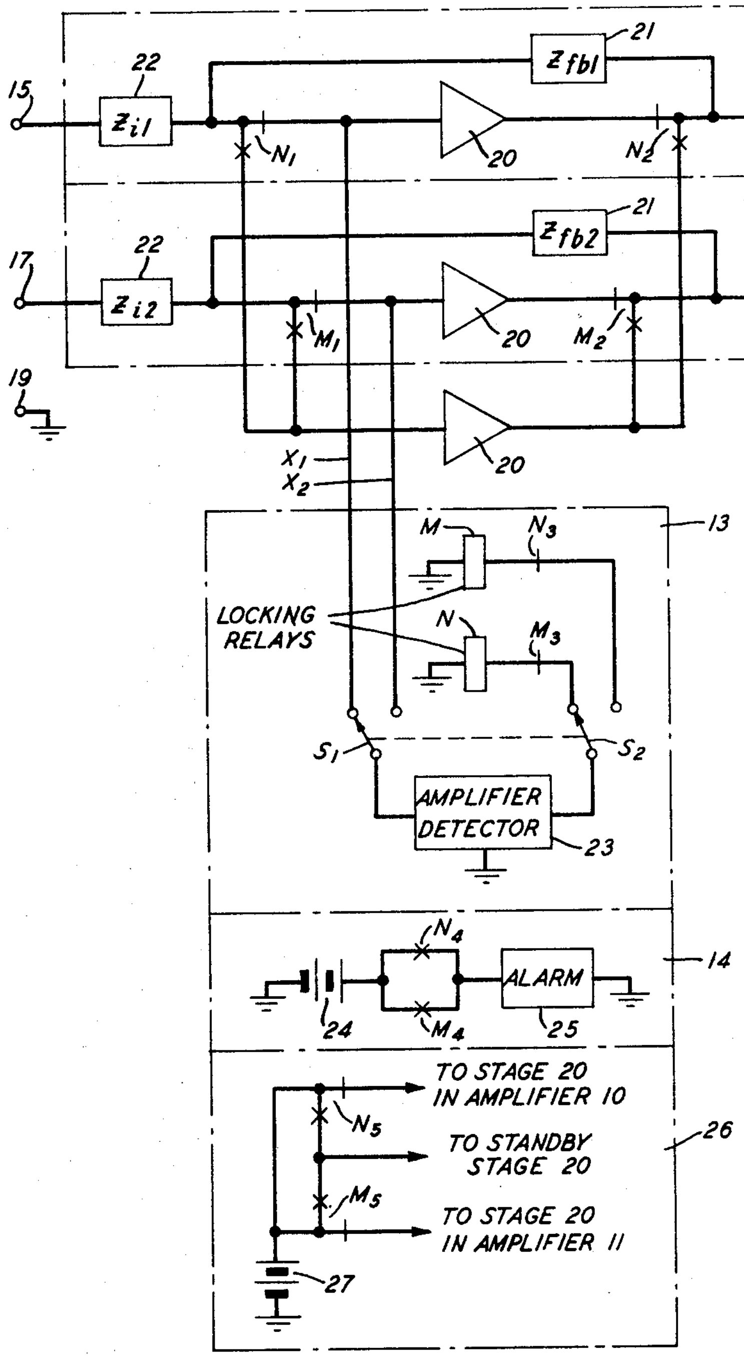

The embodiment shown in FIG. 2 is for use when the normally operating amplifiers have substantially identical amplifying stages but differing input and feedback impedances. The normally operating amplifiers have been identified as 10 and 11 as in FIG. 1. The FIG. 2 embodiment also includes a control circuit 13, an alarm circuit 14 and a power transfer circuit 26, all of which are identical to those of FIG. 1. The various components of these circuits have all been identified by the same symbols as used in FIG. 1. The only differences between these components and those of FIG. 1 is that feedback impedances 21 differ from one another as do input impedances 22.

The FIG. 2 embodiment does not include a complete standby feedback amplifier such as amplifier 12 of FIG. 1 but instead includes a standby amplifying stage 20.

Finally, relay contacts $N_1$, $N_2$, $M_1$ and $M_2$ have been moved inwardly toward stages 20 so that one of these stages is replaced by standby stage 20 when one of the relays N or M is operated. The complete mode of operation is therefore very similar to that of FIG. 1 with the exception that only an amplifying stage is replaced when a failure is detected. This embodiment provides adequate protection in many applications as the feedback and input impedances are relatively reliable components.

Referring back to FIG. 1, it should be noted that in accordance with the invention, standby amplifier 12 may also be monitored by control circuit 13 so that failure of amplifier 12 may also be detected. Furthermore, the reference level of detector 23 may be changed automatically in response to an external condition or by an operator.

Although only two embodiments of the invention have been discussed in detail, it should be understood that various other embodiments may be devised by those skilled in the art without departing from the spirit and scope of the invention.

What is claimed is:

1. In combination:

an input terminal, an output terminal, two substantially identical amplifiers, switching means connected between said amplifiers and said input and output terminals and having a normal state to connect a first of said amplifiers between said terminals and an operated state to connect the other of said amplifiers between said terminals, a feedback path connected around the amplifier connected between said terminals to provide a summing point where input and feedback signals are summed, and a threshold amplitude detector connected between said summing point and said switching means to operate said switching means when signals at said summing point exceed a predetermined level.

References Cited

UNITED STATES PATENTS

| | | | |
|---|---|---|---|
| 2,229,108 | 1/1941 | Maggio et al. | 330—124 X |
| 2,229,158 | 1/1941 | Wilson | 330—124 X |
| 2,773,944 | 12/1956 | Karlson | 328—224 X |
| 3,345,578 | 10/1967 | Shuda | 330—124 X |

NATHAN KAUFMAN, Primary Examiner

U.S. Cl. X.R.

330—84, 124